US012807085B2

(12) United States Patent
Salter et al.

(10) Patent No.: US 12,807,085 B2
(45) Date of Patent: Nov. 24, 2026

(54) ADAPTIVE LOAD MANAGEMENT WITHIN VEHICLES

(71) Applicant: FORD GLOBAL TECHNOLOGIES, LLC, Dearborn, MI (US)

(72) Inventors: Stuart C. Salter, White Lake, MI (US); Jeffrey Robert Seaman, Petersburg, MI (US); David Celinske, Wolverine Lake, MI (US); Annette Lynn Huebner, Highland, MI (US); Stuart Easson, Santa Cruz, CA (US); Brendan F. Diamond, Grosse Pointe, MI (US); Peter Attila Farkas, Ottawa (CA); Todd Ansbacher, Westland, MI (US); John Robert Van Wiemeersch, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 207 days.

(21) Appl. No.: 18/485,661

(22) Filed: Oct. 12, 2023

(65) Prior Publication Data

US 2025/0121784 A1 Apr. 17, 2025

(51) Int. Cl.
*B60R 16/03* (2006.01)

(52) U.S. Cl.
CPC .................................... *B60R 16/03* (2013.01)

(58) Field of Classification Search
CPC ...................................................... B60R 16/03
See application file for complete search history.

(56) References Cited

U.S. PATENT DOCUMENTS

| | | | | | |
|---|---|---|---|---|---|
| 4,551,812 | A * | 11/1985 | Gurr | H02J 3/003 307/35 |
| 8,738,268 | B2 | 5/2014 | Karimi et al. | |
| 11,260,723 | B2 | 3/2022 | Schumacher et al. | |
| 11,764,575 | B2 * | 9/2023 | Park | H02J 1/082 307/9.1 |
| 2005/0141154 | A1 | 6/2005 | Consadori et al. | |
| 2021/0316617 | A1 | 10/2021 | Pugh | |
| 2021/0403010 | A1 * | 12/2021 | Symanow | B60W 50/0225 |
| 2022/0024332 | A1 * | 1/2022 | Powell | B60L 58/20 |
| 2022/0111716 | A1 | 4/2022 | McKibben et al. | |
| 2022/0131398 | A1 | 4/2022 | Herranz et al. | |
| 2022/0255339 | A1 | 8/2022 | Stoltz et al. | |
| 2022/0332196 | A1 | 10/2022 | Christen et al. | |
| 2022/0385064 | A1 | 12/2022 | Cruickshank et al. | |
| 2024/0034253 | A1 * | 2/2024 | Poulis | B60R 16/0238 |
| 2024/0388122 | A1 * | 11/2024 | Fredrickson | H02J 7/0063 |

FOREIGN PATENT DOCUMENTS

| | | | |
|---|---|---|---|
| CN | 103151842 | B | 6/2013 |
| CN | 115042642 | A | 9/2022 |
| WO | 2018065043 | A1 | 4/2018 |

* cited by examiner

*Primary Examiner* — Donald J Wallace
(74) *Attorney, Agent, or Firm* — Frank Lollo; Brooks Kushman P.C.

(57) ABSTRACT

Responsive to a magnitude of current associated with power from a vehicle being supplied to loads having a same priority approaching or exceeding a predefined threshold and indication that one of the loads has not been present at a same time as other of the loads, one or more controllers may shed or operate with reduced power the one of the loads before shedding or operating with reduced power the other of the loads.

19 Claims, 3 Drawing Sheets

ADAPTIVE LOAD MANAGEMENT WITHIN VEHICLES

TECHNICAL FIELD

This disclosure relates to automotive power systems.

BACKGROUND

An automotive vehicle may include an energy storage device, such as a battery. This energy may be made available to electrical and electronic components of the vehicle and outside the vehicle. After-market snow plow equipment, for example, may be powered by energy from a battery. Such connections with the battery may be facilitated by a so-called upfitter module.

SUMMARY

A power system of a vehicle includes one or more controllers that, responsive to a magnitude of current associated with power from the vehicle being supplied to loads exceeding a predefined threshold, reduce or discontinue supply of the power to the loads according to a priority such that the loads having same priority are shed or operated with reduced power according to an indication of whether one of the loads having the same priority has been present at a same time as other of the loads having the same priority.

A method includes, responsive to a magnitude of current associated with power from a vehicle being supplied to loads approaching a predefined threshold, reducing or discontinuing supply of power to the loads according to a condition-defined priority such that the loads of lowest priority among the condition-defined priority are shed or operated with reduced power first to maintain the magnitude less than the predefined threshold, and an order of the condition-defined priority is different for different conditions.

A power system of a vehicle includes one or more controllers that, responsive to a magnitude of current associated with power from the vehicle being supplied to loads having a same priority approaching or exceeding a predefined threshold and indication that one of the loads has not been present at a same time as other of the loads, shed or operate with reduced power the one of the loads before shedding or operating with reduced power the other of the loads.

DETAILED DESCRIPTION

Figure 1:
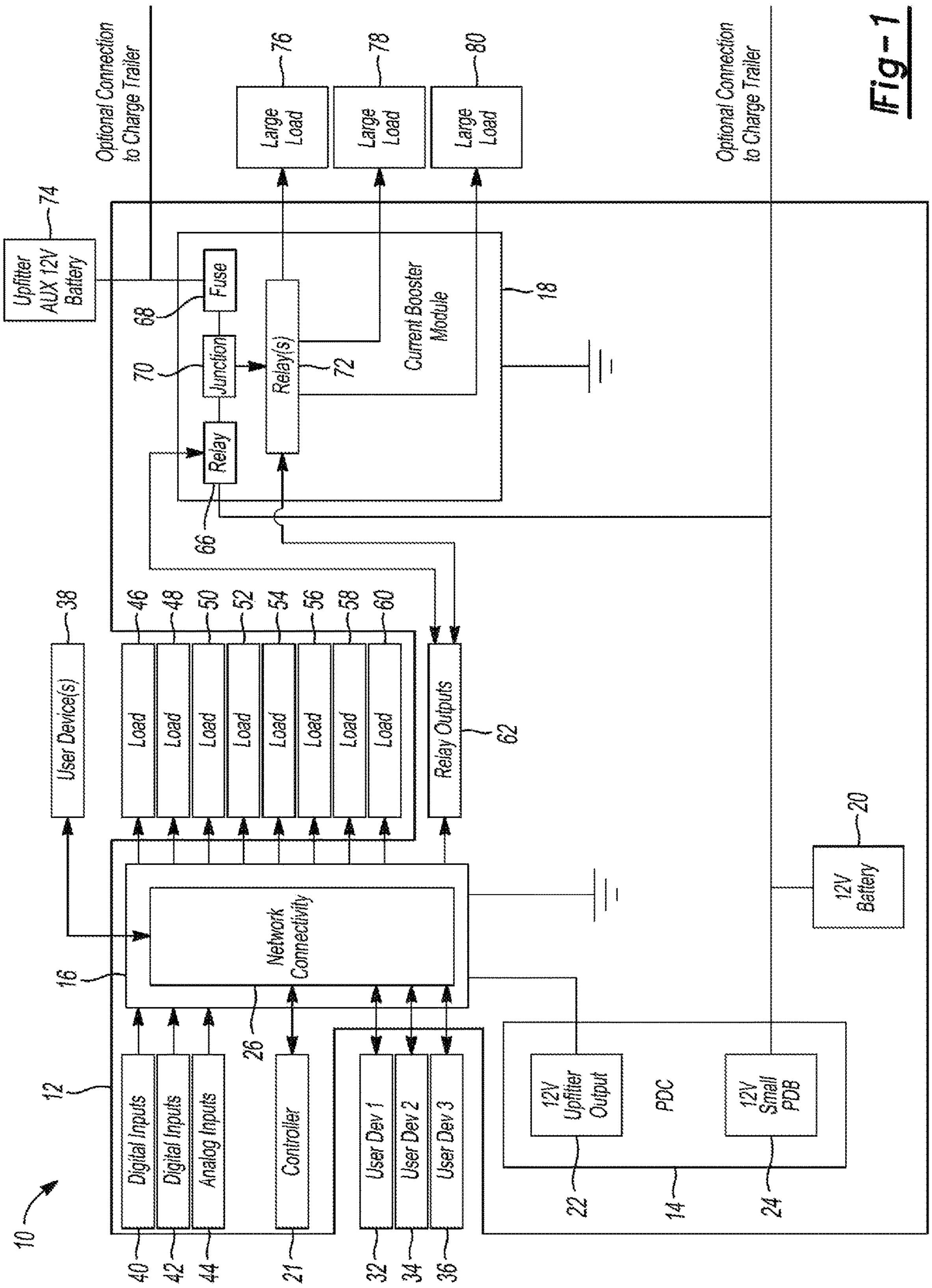
FIGS. 1 and 2 are block diagrams of an automotive power system and upfitter modules.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The use of upfitter modules can affect the power supply systems of automotive vehicles. Upfitter modules, in some examples, are modular components that can be added to a vehicle to provide additional functionality, such as lighting, power distribution, or electrical power management. An upfitter module that provides lighting and power distribution, for example, can be installed in a vehicle, allowing it to be used as a work vehicle, such as a service truck or construction vehicle. Additionally, upfitter modules can be designed to meet specific requirements, such as providing power to a specific component or group of components.

Several factors can be considered when selecting an upfitter module, including the power requirements of the component or group of components that the upfitter module will power, the voltage level required, and the environmental conditions in which the upfitter module will be used.

Some upfitter modules may not support medium or high current applications, may not be expandable, may not provide feedback to the vehicle to manage effects of high current loads, and/or do not support added video cameras, etc.

Certain upfitter modules have taken the form of switches mounted in an over-head compartment and relays in an add-on engine compartment power distribution box. In some arrangements, wires are fed to the engine compartment power distribution box, but not connected to relays. Screens may be used to support touch drive of field effect transistors that control loads.

Here, certain examples contemplate that during setup by an upfitter the vehicle may learn which device is connected to each field effect transistor and can cycle the device on/off to learn its initial load curve (running and inrush), and device priority for load shedding based on user input or vehicle to device communication. To the extent several devices have a same priority level, certain of the devices may have their power reduced or shed based on different factors. If for example upfitter loads can be pulse width modulated (typical of motor controls) or can work with low speed pulse width modulation (e.g., 10 seconds on and 30 seconds off), they can be interleaved or staggered with other loads at the same priority level. Rather than shedding the load (e.g., a light) completely, the system may deliver a lower level of average power. A water pump motor of a camper, for example, may be run slower (i.e., with reduced flow) while maintaining overall, but possibly reduced, functionality of other upfitter loads.

After setup, the vehicle may continue to learn and update its tables. During operation, the vehicle may monitor via sensors all upfitter field effect transistors to maintain accurate data on which loads are typically on together (in case it has to select among equally prioritized loads) and how each load varies with parameters such as time of day, outside ambient temperature, device temperature (if a corresponding sensor is present), gear position, length of operation, etc.

In certain examples of dynamic load shedding, a vehicle determines whether enough current is available to supply all loads. If no, a look up table of prioritized loads to be shed from least priority to greatest priority may be consulted. Lowest priority loads may then be shed until current demand is no longer greater than current supply. If multiple loads have same priority level, which devices are typically on at a same time may be examined.

As mentioned above, the vehicle may learn through sensor data which loads tend to be present at a same time. This information can be used to select which loads should be shed that have a same priority level. For example, during plowing, a plow motor, plow light, and salt spreader motor may be on together. If a salt bin light is inadvertently left on and has the same priority as the plow motor, plow light, and salt spreader motor, the salt bin light may be shed because it is not normally on in tandem with the others. Even if an upfitter incorrectly defined the salt bin light as having the same priority as the plow motor, plow light, and salt spreader motor, it may nevertheless be shed first.

Certain architectures may provide upfitters opportunity to enable both low power and high power loads that are controlled by the vehicle with feedback. In some examples, a base upfitter module is tied to the vehicle via Ethernet and acts as a gateway connecting down-stream expansion modules. A plurality of additional upfitter modules can be connected to the first. Each expansion module recognizes that it is either a master or not, and is daisy chained to a preceding module. This allows the number of modules to be expanded. Each of these modules may thus be plug-and-play, sending signals back to the controller reporting their capabilities. All expansion modules may receive their power from a 100 A output, 200 A output, or other rated output of a power distribution center for example. As current usage approaches (e.g., comes within 10% or 5% of) the limit, an operator is notified: The base module reports on loads to the controller.

If multiple devices have the same priority level, it may be determined whether these devices are permitted to be operated with pulse width modulated power. If so, the device power may be reduced via low speed cycling into a rotation. The system may wait for the charge margin to increase before returning loads back to full power.

For each circuit that that uses the proposed load shedding strategy, the vehicle may map out the capabilities of each branch of the circuit based on user input and/or installation specifications from an outfitter/manufacturer. Each branch of the circuit may be connected to a different load/device, and each branch may include a circuit breaker rated to a specific current, a relay, or a field effect transistor that can be capable of pulse width modulation control. The vehicle can learn/store which devices are connected to each branch of the circuit based on user input or vehicle to device communication. The maximum or continuous current ratings for each branch and for the overall circuit may be programmed into the vehicle based on the hardware specifications so the vehicle can program how much "overhead" to maintain and/or create based on which device/branch of the circuit has priority.

During usage of the device/load being powered, the vehicle may monitor via sensors the current output regarding the maximum continuous current, inrush current, time averaged current for different time durations, and/or variation in current during normal usage needed to operate each device/branch of the circuit.

This arrangement permits automatic load shedding of other vehicle loads and/or upfitter loads, and is programmable by a user, can run off power from an auxiliary charger trailer with a DC/DC converter, and allows key-off operation of various loads. Moreover, high current may be tied with the batteries to keep transients off of the expansion module power and permits the batteries to act as transient suppression agents for the high current module.

As mentioned above, a relative importance (e.g., user specified priority) can be defined by the user regarding each device on each circuit. This priority rating can be used to coordinate the order of load shedding for when the devices are approaching the current limit of the circuit. The user can also specify requirements regarding the type of derating/load shedding that can occur for each branch of the circuit. Types of load shedding that can occur may include each device being turned on/off (e.g., circuit breaker type operation) or pulse width modulation for two types of control based on the device: operate device at some percent duty cycle over short time periods (e.g., 10 Hz to 10 kHz, switch device on very rapidly such that the effective voltage is a percentage of the maximum voltage); or, operate device at some percent duty cycle over longer time periods (e.g., 10 s to 600 s, operate device on for 10 s, then turn off for 50 s for a 16.6% duty cycle). The user may program, or the device may communicate, how the load should be shed to prevent device issues. The relative importance regarding load shedding can also be specific to the location of the vehicle (e.g., geofenced), based on the operation of the vehicle (e.g., parked vs. driving vs gear position), or based on a mode of the vehicle (e.g., "work mode" or "drive mode;" being used to recharge vehicles versus being used for plowing snow, etc.).

The vehicle may also choose to shut off certain devices/branches of the circuit based on identifying the location of users relative to the device/load associated with a branch of a circuit. Examples can include if there is nobody in the car as determined via interior radar/interior cameras, interior climate components (e.g., heated steering wheel, etc.) can be turned off; if there is no one in the vehicle, then the vehicle does not need to be able to operate an attached snow plow.

Priority can also be assigned during initial startup of each device such that each device starting is staged to prevent the inrush current from increasing beyond the circuit capability.

During usage, the capability of the circuit will be monitored relative to the actual usage of the circuit, and based on the defined priority and load shedding requirements specified, the vehicle may derate various parts of the circuit to stay within capabilities (e.g., current or temperature based capabilities) as suggested previously. The maximum current capabilities may be defined over various time intervals (e.g., 500 A for 10 s; 300 A for 60 s; 250 A continuous or based on the maximum design temperature of various components in the circuit). A specific threshold can be maintained by the circuit regarding a desired current headroom and devices may be derated/turned off to maintain that headroom. The headroom target can be based on the maximum, time averaged, or expected current from the highest priority loads and/or circuits such as 10% of the summed 90th percentile average current of the X highest priority components on the circuit. The headroom can be adjusted up or down to ensure the X highest priority devices maintain full capability. The headroom may not need to be as large for devices/loads with low variation in input current and vice versa. Historical/real time data may be monitored and recorded for loads/devices to provide reasonable estimates of the headroom needed. Control of load shedding can also be based on the temperature of a device and/or field effect transistor for each circuit branch to prevent issues during operation.

Based on which circuits are derated, the customer may be informed regarding which and how much each circuit is derated. When the user changes out a device on a specific circuit, user input or vehicle to device communication can be used to recognize this event occurred and reprogram the vehicle stored data on the branch of the circuit that was changed.

Features may also be prioritized while the vehicle is deactivated (e.g., key off) or while the user is absent. Given a base or known weighting (priority) scheme that is user defined or based on learned usage that prioritizes certain features over others with regard to load shedding, dynamic situation priority can be incorporated that takes account of various factors (e.g., ambient temperature, distance from home, location familiarity, etc.) and alters the priority scheme depending on the situation. This dynamic option can consider i) ambient temperature which may affect both starting (the amount of energy required to crank) and charging (the ability of a battery to accept charge), ii) opportunity to pull up the engine to charge the battery, which can vary depending on location (e.g., inside versus outside, idle restrictions, etc.), fuel level, distance to nearest open gas station, etc., iii) distance from home or charging location, iv) nearby people outside the vehicle or movement around the vehicle, v) occupancy (e.g., could have a driver or passengers present, potentially moving windows up/down for active heating/cooling, etc.), vi) the last driver of the vehicle, vii) devices charging in the vehicle (e.g., charging via USB, etc.), viii) strength of cell or other wireless signal (strategy for performing over the air updates), ix) day or night, and/or time until daylight, and/or x) security or rescue vehicle prioritization.

Opportunistic use cases may only run if the resources are already on for other features, which means they will not lead to additional power consumption. Flexible use cases for features specify the latest possible time to run, and a virtual power state manager may try to schedule it to run when other feature use cases (that use the same or at least overlapping resources) are also running in order to reduce or eliminate power consumption caused by that use case.

In certain examples, a controller of a vehicle may learn through sensor monitoring how features of the vehicle consume battery power and how the same are used while the vehicle is deactivated. A priority scheme may be created from this learning or via user designation ranking the list of features used by amount of energy consumed while the vehicle is active and while the vehicle is deactivated. The priority scheme may be modified taking account of vehicle situation as described above (e.g., occupancy, devices charging in the vehicle, etc.). Consideration may then be given for opportunistic and flexible use cases. The driver may then be informed of what will be prioritized and why via alerts. As state of charge drops, features may be modified to use less power: put certain control units to sleep; dial climate control to a level that is still comfortable but not as cold or not as warm but still able to keep the windshield clear; deactivate heated steering wheel (allow re-activation if customer requests same); deactivate rear entertainment; cap peak volume of audio system (suggest it be shut off if not being used for road information or news); ask if phone/computer charging can be suspended, or shut down phone charger if phone state of charge exceeds a predefined threshold; ask if cabin wireless hot spot can be deactivated; deactivate tire pressure monitoring; reduce screen brightness until someone touches the screen; and/or, deactivate certain lights.

Alerts (e.g., audio, visual, etc.) may be used to indicate that load shedding is expected (e.g., the power limit at which load shedding will occur is being approached) or is actually taking place. Such alerts may be calibrated based on background noise, distance to others, and/or location. Cameras, radar, and the like, for example, could be used to detect whether people are nearby, whether the vehicle is indoors or outdoors, etc. If the vehicle is indoors and people are nearby, audio alerts may be generated at lower volume to contribute less to ambient noise. Alerts may also be used to indicate the type of load shedding that is about to occur. Expected shedding of vehicle loads, for example, may be associated with different user defined sounds than expected shedding of upfitter loads. Graphic displays related to the same may also be different in similar fashion. When current magnitude limits are exceeded, the system may generate notifications using sound exciters, window projectors, etc.

Prior to upfitter connection, a user may provide the vehicle the expected load profile to be incorporated into a corresponding configuration file. Use case details (e.g. identification data, expected duration, severity, resources needed, current consumption, etc.) may be incorporated into the configuration file which may be read as a look up table once the upfitter request is received. When communications are established with appropriate interfaces, the upfitter would be able to communicate intended needs based on "use case" systems. Alternatively, when communications have been established with the upfitter, the user may be able to enter/upload the expected load profile via touch screen with customized or pre-configured selections for review.

When a use case by the upfitter is sent, the system may make the determination if the request is valid or invalid based on available power supply capability. When the upfitter exceeds the allowable current draw threshold of the connected field effect transistor (e.g., 100 A or 200 A depending on the rating of the corresponding field effect transistor), the field effect transistor may be tripped and the user notified regarding the exceeded threshold with options for an automatic or manual retry.

There is thus more user control and feedback to the upfitter usage rather than no notification. And prior to switching over to meet upfitter energy demands, the system may provide the option to the user to shed loads based on various factors including load type (e.g., radio, air-conditioner, upfitter load, etc.)

Referring to FIG. 1, an example automotive power system 10 for a vehicle 12 includes a power distribution center 14, an upfitter module 16, an upfitter current booster module 18, a 12V battery 20, and a controller 21.

The power distribution center 14 includes a 12V upfitter output 22 (e.g., a 100 A field effect transistor controlled output) and a 12V interconnector power distribution box 24 (e.g., a 200 A field effect transistor controlled output). The respective ratings of these field effect transistors thus define what their limits are for current flow therethrough. The 12V upfitter output 22 is connected with the upfitter module 16. The interconnector power distribution box 24 is connected with the 12V battery 20.

The upfitter module 16 is grounded and includes network connectivity 26, which is connected with a plurality of user devices 32, 34, 36, 38. The upfitter module 16 is configured to receive digital inputs 40, 42 and an analog input 44, and to provide current to loads 46, 48, 50, 52, 54, 56, 58, 60 in this example. The upfitter module 16 is further configured to provide current to relay outputs 62. Multiple such upfitter modules can be so connected (e.g., daisy chained) to obtain as many inputs/outputs as necessary as mentioned above.

The upfitter current booster module 18 is grounded and includes a relay 66, a fuse 68, a junction 70, and a plurality of relays 72. The junction 70 is connected between the relay 66, fuse 68, and relays 72. The relay 66 is connected with the interconnector power distribution box 24. The fuse 68 is connected with an auxiliary 12V battery 74. The relays 72 are configured to provide current to a plurality of large loads 76, 78, 80.

In the above described high current architecture, the upfitter current booster module 18, which can be stamped track relays controlled by the upfitter module 16, is powered from a power distribution center output different from the upfitter module 16. All the expansion modules receive their power from a 100 A output from the power distribution center 14. As current usage approaches the 100 A limit, the operator can be notified (e.g., by screen, phone-as-a-key, speaker, etc.) via, for example, alerts generated and forwarded by the controller 21. The upfitter module 16 tracks and reports on loads to the controller 21, which can facilitate notification of the operator.

The upfitter module 16 allows/facilitates reduced power operation or automatic load shedding (the discontinuing of power being supplied) of vehicle loads and/or upfitter loads (e.g., snow plow equipment, power tools, accessory lighting, etc.) prioritized by the operator or automatically prioritized via learned data to stay within the 100 A limit of the corresponding power distribution center output. If 100 A (or 200 A depending on the output port) is not available (as assessed using standard techniques such a current sensors, etc.) from the power distribution center 14, the controller 21 notifies the upfitter module 16. The upfitter module 16 can then request that vehicle loads be operated with reduced power or shed (e.g., radio, heating, ventilation, air conditioning, etc.). The controller 21, responsive to such requests, can then generate commands to reduce or discontinue power flow to the user defined lowest priority vehicle loads. This allows upfitter features to be prioritized in certain scenarios. The reverse, and other scenarios, are also possible as explained in more detail below.

A user may input via an interface (e.g., phone screen, vehicle screen, buttons, etc.) a desired priority scheme for the shedding or reduced power operation of upfitter loads and vehicle loads. The user, for example may prioritize all upfitter loads over vehicle loads such that vehicle loads will be shed in order from lowest priority to highest priority before any upfitter loads are shed. Alternatively, the user may prioritize all vehicle loads over upfitter loads such that upfitter loads will be shed in order from lowest priority to highest priority before any vehicle loads are shed. In other situations, the user may prioritize vehicle loads and upfitter loads in mixed fashion such that some of the vehicle loads have a higher or lower priority than some of the upfitter loads, etc. This information may reside within the upfitter module 16, the controller 21, and/or other controllers/modules. As the current magnitude associated with the power being supplied to the upfitter loads approaches a limit, commands may be generated by the controller 21 to discontinue power supply to upfitter and/or vehicle loads of lowest priority to attempt to maintain the magnitude less than the limit. That is, if upfitter load 1 and vehicle load 1 has highest priority, vehicle load 2 has middle priority, and upfitter load 2 has lowest priority, upfitter load 2 would be shed first in an attempt to maintain current magnitude less than the limit of the corresponding output. If shedding upfitter load 2 is not sufficient to maintain the current magnitude less than the limit, vehicle load 2 would then be shed next, etc.

Optional connections to a charge trailer are shown for the 200 A output. Communication with the charge trailer can be, for example, via controller area network or Ethernet. This allows the upfitter to exceed the 200 A continuous power distribution center limits.

Figure 2:
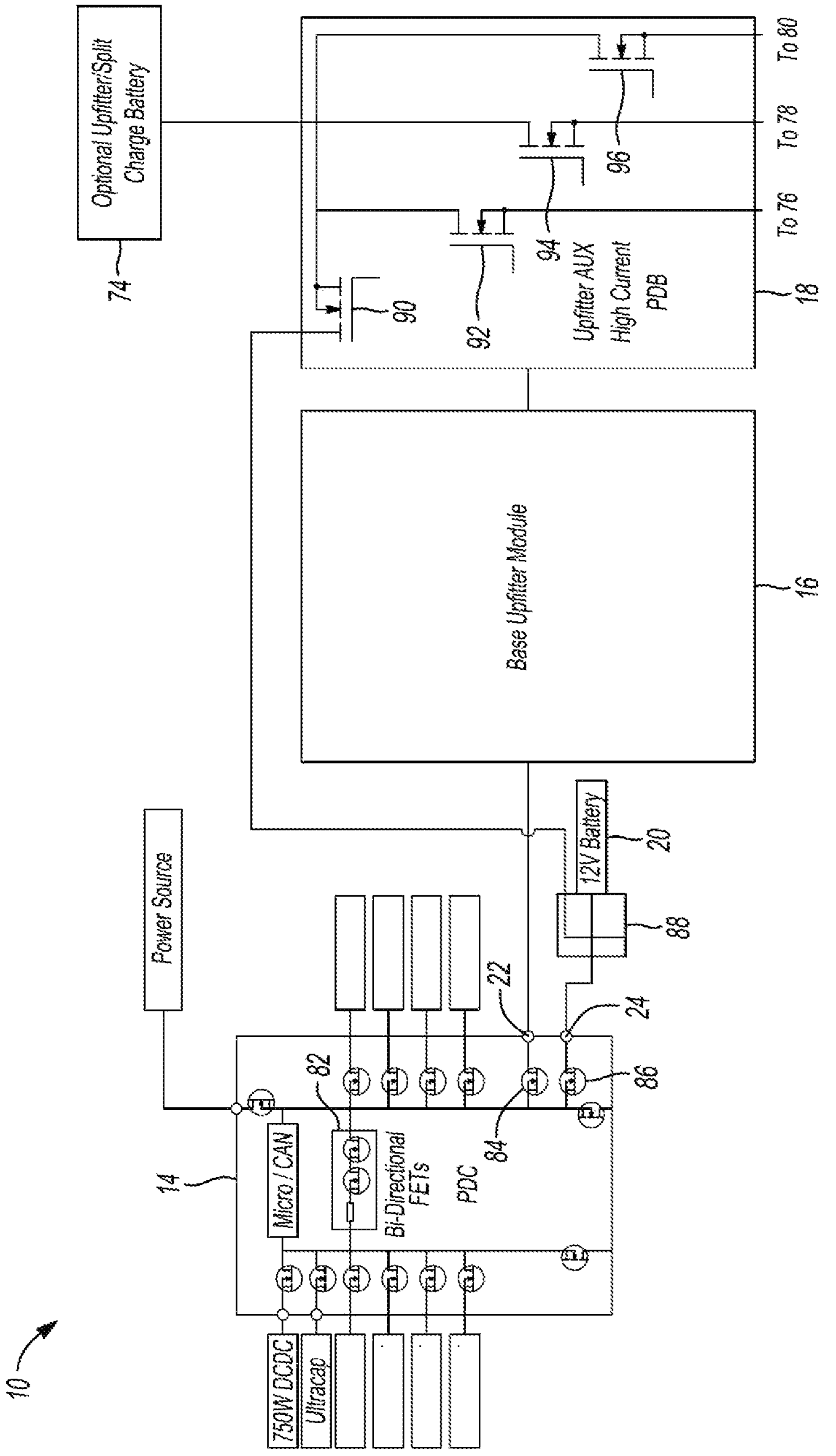

Referring to FIG. 2, the power distribution center 14 further includes a plurality of bidirectional field effect transistors 82, a 100 A capable field effect transistor 84 (continuous), and a 200 A capable field effect transistor 86 (continuous). The 100 A capable field effect transistor 84 is connected between the bidirectional field effect transistors 82 and 12V upfitter output 22. The 200 A capable field effect transistor 86 is connected between the bidirectional field effect transistors 82 and the interconnector power distribution box 24. The power distribution center 14 also includes other field effect transistors connected between the bidirectional field effect transistors 82 and other vehicle components (e.g., a DC/DC converter, an ultra-capacitor, other power sources, etc.).

The automotive power system 10 may further include a power distribution box 88. The power distribution box 88 may be packaged on top of or next to the 12V battery 20. It may serve as an interconnection point for the upfitter current booster module 18, 12V battery 20, interconnector power distribution box 24, and any jump start post.

The upfitter current booster module 18 further includes a plurality of field effect transistors 90, 92, 94, 96. The field effect transistor 90 is connected between the power distribution box 88 and field effect transistors 92, 94, 96. The field effect transistor 92 is connected between the large load 76 and field effect transistor 90. The field effect transistor 94 is connected between the auxiliary 12V battery 74, large load 78, and field effect transistor 90. The field effect transistor 96 is connected between the large load 80 and field effect transistor 90. The field effect transistor 90 is thus arranged to isolate the large load 76, 78, 90 from negative transient loads. These loads may be some of the loads that are assigned priority in the event shedding becomes necessary as described above.

Figure 3:
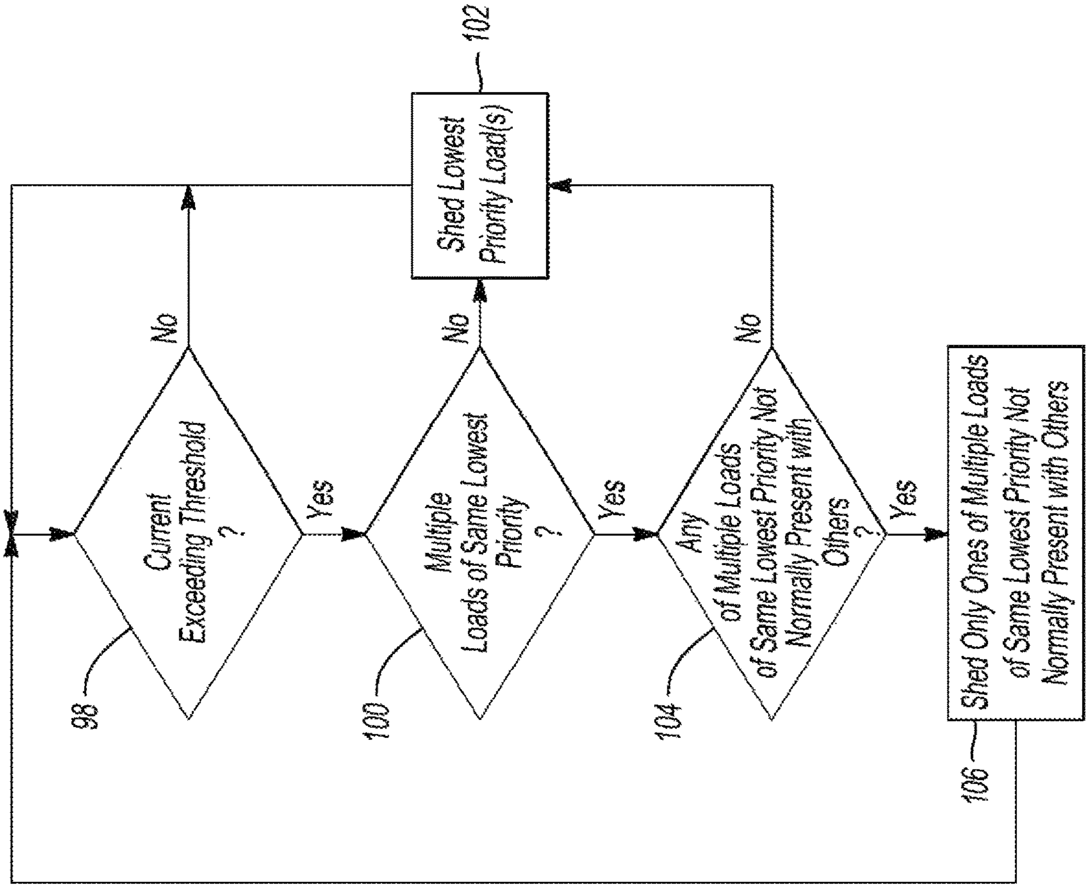
FIGS. 3 and 4 are flow charts of algorithms related to control of load shedding for upfitter and vehicle loads.

Referring to FIG. 3, it is determined whether a magnitude of current being supplied to loads is exceeding a predefined threshold at operation 98. If no, the algorithm returns to operation 98. If yes, it is determined whether there are multiple loads of same lowest priority. If no, the lowest priority load is shed at operation 102, and the algorithm returns to operation 98. In the interest of brevity, references to shedding can be substituted with references to reduced power operation. If yes, it is determined whether any of the multiple loads of same lowest priority are not normally present with the others at operation 104. If no, the lowest priority loads are shed at operation 102, and the algorithm returns to operation 98. If yes, only ones of the multiple loads of same lowest priority not normally present with the others are shed at operation 106. The algorithm then returns to operation 98.

Figure 4:
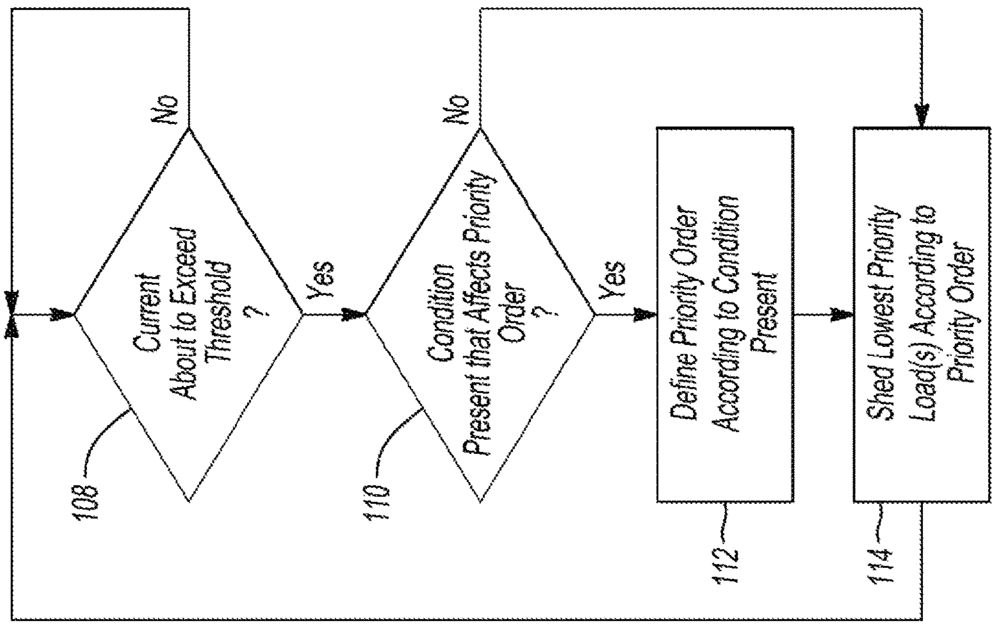

Referring to FIG. 4, it is determined whether a magnitude of current being supplied to loads is about to exceed a predefined threshold at operation 108. If no, the algorithm returns to operation 108. If yes, it is determined whether there is a condition present that affects the priority order at operation 110. If yes, the priority order is redefined (reordered) according to which condition is present at operation 112. The lowest priority load or loads are then shed according to the priority order at operation 114. The algorithm then returns to operation 108. Returning to operation 110, if no, the algorithm proceeds to operation 114.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of these disclosed materials. The terms "controller" and "controllers," for example, can be used interchangeably herein as the functionality of a controller can be distributed across several controllers/modules, which may all communicate via standard techniques.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A power system of a vehicle, comprising:

one or more controllers programmed to, responsive to a magnitude of current associated with power from the vehicle being supplied to loads exceeding a predefined threshold, reduce or discontinue supply of the power to the loads according to a priority such that the loads having same priority are shed or operated with reduced power according to an indication of whether one of the loads having the same priority has been present at a same time as other of the loads having the same priority.

2. The power system of claim 1, wherein the one or more controllers are further programmed to, responsive to the indication that the one of the loads having the same priority has not been present at the same time as the other of the loads having the same priority, shed or operate with reduced power the one of the loads before shedding or operating with reduced power the other of the loads.

3. The power system of claim 1, wherein the priority is condition dependent such that an order of the priority is different for different conditions.

4. The power system of claim 3, wherein the one or more controllers are further programmed to receive input defining the order.

5. The power system of claim 1, wherein the predefined threshold is based on historical data.

6. The power system of claim 3, wherein the conditions include temperature, time of day, location of the vehicle, gear position of the vehicle, or presence of an occupant within the vehicle.

7. The power system of claim 1, wherein the loads are upfitter loads, vehicle loads, or both.

8. A method comprising:

responsive to a magnitude of current associated with power from a vehicle being supplied to loads approaching a predefined threshold, reducing or discontinuing supply of power to the loads according to a condition-defined priority such that the loads of lowest priority among the condition-defined priority are shed or operated with reduced power first to maintain the magnitude less than the predefined threshold, and an order of the condition-defined priority is different for different conditions; and shedding or operating with reduced power the loads of lowest priority according to an indication of whether one of the loads of lowest priority has been present at a same time as other of the loads of lowest priority.

9. The method of claim 8 further comprising shedding or operating with reduced power the one of the loads before shedding or operating with reduced power the other of the loads responsive to the indication that the one of the loads has not been present at the same time as the other of the loads.

10. The method of claim 8 further comprising receiving input defining the order.

11. The method of claim 8, wherein the predefined threshold is based on historical data.

12. The method of claim 8, wherein the conditions include temperature, time of day, location of the vehicle, gear position of the vehicle, or presence of an occupant within the vehicle.

13. The method of claim 8, wherein the loads are upfitter loads, vehicle loads, or both.

14. A power system of a vehicle, comprising:

one or more controllers programmed to, responsive to a magnitude of current associated with power from the vehicle being supplied to loads having a same priority approaching or exceeding a predefined threshold and indication that one of the loads has not been present at a same time as other of the loads, shed or operate with reduced power the one of the loads before shedding or operating with reduced power the other of the loads.

15. The power system of claim 14, wherein the priority is condition dependent such that an order of the priority is different for different conditions.

16. The power system of claim 14, wherein the one or more controllers are further programmed to receive input defining the order.

17. The power system of claim 16, wherein the predefined threshold is based on historical data.

18. The power system of claim 15, wherein the conditions include temperature, time of day, location of the vehicle, gear position of the vehicle, or presence of an occupant within the vehicle.

19. The power system of claim 14, wherein the loads are upfitter loads, vehicle loads, or both.

* * * * *